R. M. LOCKWOOD.
GALVANIC BATTERY.

No. 170,864.  Patented Dec. 7, 1875.

Witnesses
Chas H Smith
Harold Serrell

Inventor
Robert M. Lockwood
per Lemuel W. Serrell
Atty.

UNITED STATES PATENT OFFICE.

ROBERT M. LOCKWOOD, OF NEW YORK, N. Y., ASSIGNOR TO HIMSELF AND ELISHA W. ANDREWS, OF SAME PLACE.

IMPROVEMENT IN GALVANIC BATTERIES.

Specification forming part of Letters Patent No. 170,864, dated December 7, 1875; application filed September 1, 1874.

*To all whom it may concern:*

Be it known that I, ROBERT M. LOCKWOOD, of the city and State of New York, have invented an Improvement in Galvanic Batteries, of which the following is a specification:

Porous cups have been extensively used in batteries, but they become injured by the deposit from the sulphate of copper; and batteries have been made with the zinc above the copper, but the particles of zinc, becoming detached and falling among the sulphate-of-copper crystals, lessen the efficiency of the battery, and consume the materials to no purpose.

I make use of a porous cup above the copper and below the zinc, to catch any particles of zinc, and also to render the battery more uniform and constant. The bottom of this porous cup is made convex, to prevent the accumulation of bubbles of gas; hence there is no non-conducting layer between the poles, and the porous cup supports the zinc, and is itself supported by projections from the copper pole, and these all rest upon the crystals of sulphate of copper; hence the relative distances are maintained, and the battery rendered very economical and uniform from its commencement until the sulphate of copper is consumed.

Figure 1:
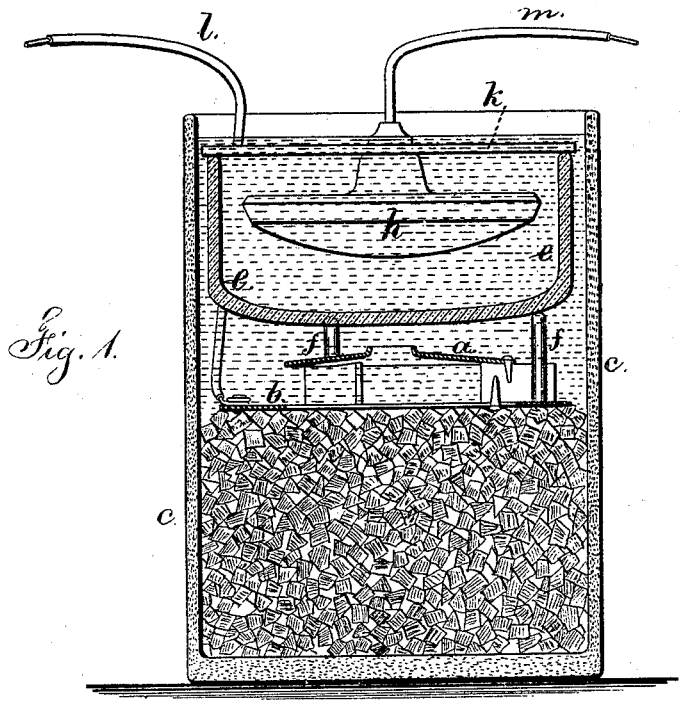
Figure 2:
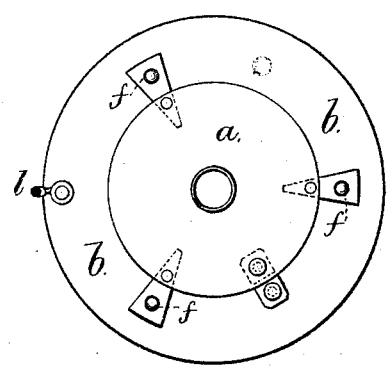

In the drawing, Figure 1 is a vertical section of said battery, and Fig. 2 is a plan of the copper pole.

The copper pole $a$ is made of a funnel shape, having an opening at the apex substantially similar to that shown in my Patent No. 149,320, except that the base-ring $b$ is preferably larger than the cone $a$, and is connected to such cone, so as to allow of an annular opening between the parts $a$ and $b$. The copper pole $a\,b$ is within the jar or cell $c$, and rests upon the crystals of sulphate of copper. The porous cup $e$ is made with a convex bottom, so that there will not be any obstruction to the battery by bubbles of gas accumulating beneath such porous cup. This porous cup is sustained in place by any desired means. I prefer and use the glass or other supports $f$, that intervene between the copper pole $a\,b$ and the cup $e$. The zinc pole $h$ is made with a rounded bottom side, for the same reason that the porous cup is rounded, and this zinc pole is supported in any convenient manner within the porous cup. I have shown the cross-bar $k$ of wood. The wires $l\,m$ connect with the respective poles of the battery.

Any particles of zinc will be retained by the porous cup; hence the copper solution will be kept clean, and the copper and zinc poles will be preserved at the proper and uniform distance apart, and they descend together as the sulphate of copper is consumed, thereby maintaining uniformity in the strength of the battery.

I claim as my invention—

1. The porous cup, resting upon or sustained by a connection to the copper pole, and the zinc pole supported within the porous cup, so that the relative position of the poles is maintained, and they rest upon the sulphate-of-copper crystals in the cell, as set forth.

2. The copper pole, made of the funnel-shaped plate $a$ and ring $b$, connected together and receiving the supports $f$, that sustain the porous cup $e$, as and for the purposes set forth.

Signed by me this 29th day of August, 1874.

R. M. LOCKWOOD.

Witnesses:
 GEO. D. WALKER,
 CHAS. H. SMITH.